UNITED STATES PATENT OFFICE.

EDWARD WATSON, OF GRAND RAPIDS, MICHIGAN.

COMPOSITION FOR RETARDING THE SOLIDIFICATION OF CALCINED GYPSUM.

SPECIFICATION forming part of Letters Patent No. 472,322, dated April 5, 1892.

Application filed April 22, 1891. Serial No. 390,073. (No specimens.)

*To all whom it may concern:*

Be it known that I, EDWARD WATSON, a citizen of the United States, residing at Grand Rapids, in the county of Kent and State of Michigan, have invented a new and useful Composition of Matter for Restraining the Solidification of Calcined Gypsum, of which the following is a specification.

My invention relates to the restraining of the setting or solidification of calcined gypsum in any combinations in which it is an ingredient. As it is, the calcined gypsum which is to be restrained and the agent which I use to accomplish this result is the substance (either liquid or dry) of the product known to renderers of fats as "tank-water."

In carrying out my invention I may mix tank-water directly with the water in mixing the mortar for plastering, in combination with sand, lime, calcined gypsum, hair or other fiber, or whatever may enter in combination with calcined gypsum, or I may mix the tank-water with the water to be used in mixing calcined gypsum without other ingredients, or I may first reduce the tank-water to a semi-solid consistency known as "stick" and use it in proper proportions in place of tank-water, as above described. Stick will keep almost indefinitely without decomposition, and may thus in a concentrated form be kept and transported and be ready for use as a restrainer by mixing it with the water in which the plaster is to be mixed. I may for greater convenience first reduce the tank-water or stick to a dry condition, which may then be used at the time of mixing the mortar, or it may be first intimately mixed in proper proportions with dry calcined gypsum and thus be ready for use at any subsequent time.

To reduce tank-water or stick to a permanent dry condition I add to it a quantity of any dry substance which may not be objectionable for the desired purpose. For this purpose I usually add to each gallon of tank-water or to its equivalent of stick about five pounds of other material. I may for the purpose use any earthy substance, silicious or aluminous, or any metallic oxides, or an alkaline earth or its salts, or an alkali or a salt of the same, or any animal or vegetable substance. After mixing thoroughly with the tank-water a substance, as stated, the mass may then be dried by any proper means and finally reduced to a fine powder. The object, as stated, in this addition of other matter is to render the material more manageable and to retain it in a permanent dry condition, as tank-water if evaporated to dryness without the addition of some other agent is deliquescent and cannot be kept as a dry powder if exposed to air or moisture.

The proportions of this material to be used will depend upon the desired time the plaster is to be restrained. To retard the setting from half an hour to three or more hours the following proportions will be about right: of tank-water, from two to ten gallons to a ton of calcined gypsum; of the semi-solid substance stick, from two to ten pounds to a ton of calcined gypsum, or of the dry material, prepared as above, from five to fifteen pounds to a ton.

What I claim is—

The herein-described compound for plaster, consisting, essentially, of calcined gypsum, with the addition thereto, as a means of retarding its solidification, of substantially the proportions stated of the substance known to renderers of fats as "tank-water," substantially as and for the purpose specified.

EDWARD WATSON.

Witnesses:
C. J. DE YOUNG,
C. L. HANEY.